US005500402A

United States Patent [19]

Vangbo

[11] Patent Number: 5,500,402
[45] Date of Patent: Mar. 19, 1996

[54] METHOD FOR THE MANUFACTURE OF A CONTACT BODY FOR THE EXCHANGE OF MOISTURE OR HEAT

[75] Inventor: Håkan Vangbo, Järfälla, Sweden

[73] Assignee: AB Carl Munters, Sollentune, Sweden

[21] Appl. No.: 232,040

[22] PCT Filed: Sep. 6, 1992

[86] PCT No.: PCT/SE92/00770

§ 371 Date: Apr. 26, 1994

§ 102(e) Date: Apr. 26, 1994

[87] PCT Pub. No.: WO93/08910

PCT Pub. Date: May 13, 1993

[30] Foreign Application Priority Data

Nov. 8, 1991 [SE] Sweden ................................. 9103305

[51] Int. Cl.$^6$ .................................................. B01J 20/10
[52] U.S. Cl. ........................... 502/408; 423/335; 423/338; 252/194; 252/315.6
[58] Field of Search ...................... 502/232, 233, 502/408; 252/315.6, 194; 423/335, 338

[56] References Cited

U.S. PATENT DOCUMENTS

| | | | |
|---|---|---|---|
| 3,567,645 | 3/1971 | Dultz | 252/194 |
| 4,837,195 | 6/1989 | Cox et al. | 502/408 |
| 4,886,769 | 12/1989 | Kuma et al. | 502/62 |
| 5,254,195 | 10/1993 | Tseng et al. | 156/184 |
| 5,328,645 | 7/1994 | Lin et al. | 252/315.6 |
| 5,368,833 | 11/1994 | Johansson et al. | 423/338 |
| 5,376,348 | 12/1994 | Stoilov et al. | 423/338 |

FOREIGN PATENT DOCUMENTS

| | | | |
|---|---|---|---|
| 3023211 | 1/1991 | Japan. | |
| 1212942 | 2/1986 | U.S.S.R. | 423/338 |
| 1333635 | 8/1987 | U.S.S.R. | 423/335 |

*Primary Examiner*—Gary P. Straub
*Assistant Examiner*—Timothy C. Vanoy
*Attorney, Agent, or Firm*—Dowell & Dowell

[57] ABSTRACT

A method for treating a contact body for the exchange of heat or moisture comprises impregnating a contact body with waterglass and treating the impregnated body in acidic and basic environments to form a controlled pore structure.

16 Claims, No Drawings

1

METHOD FOR THE MANUFACTURE OF A CONTACT BODY FOR THE EXCHANGE OF MOISTURE OR HEAT

BACKGROUND OF THE INVENTION

1. Field of the Invention

The present invention relates to a method of treating a contact body intended for the exchange of heat, moisture or the like.

2. History of the Related Art

Contact bodies are used in different applications for the exchange of moisture and/or heat, and are normally produced from sheets of paper which are preferably comprised of inorganic material and formed into blocks from which solid contact bodies are produced or wound to form rotors for use in rotary exchangers or contact bodies.

Such bodies contain a moisture and/or heat-exchanging mass of alternating flat and corrugated layers which are so arranged that the corrugations form a large number of fine passages which extend generally parallel with one another. The flat and the corrugated layers are mutually combined and bonded to one another, normally by gluing the layers, whereafter, when a rotor is to be produced, the structure comprised of one flat layer and one corrugated layer is wound to form a generally cylindrical rotor in which the passages extend parallel with the rotor axis. When producing solid contact bodies, a number of such structures are stacked one upon the other to form a block. The turns of the rotor or the structural units forming said block are mutually bonded together in the same way as the flat and the corrugated sheets, for instance by gluing.

It is known in the manufacture of such contact bodies for heat or moisture exchange purposes to impregnate the paper sheets of said bodies with a waterglass solution. The applied waterglass solution is then treated in different ways, e.g. dried by heating or by dipping the contact bodies in a spirit bath (see SE Patent No. 305,170) and then treated with acid, salt or the like to form a silica gel.

When producing a gel with the intention of manufacturing a structure that is suitable for moisture exchange purposes, it is essential to obtain a desired mean pore size and pore size distribution in a controlled fashion. When the exchange element is used to de-moisturize air and thus adsorbs moisture from the air, the moisture content of the air will change as the air passes over an effective adsorption surface, and consequently, in order to be effective, the adsorbent must be effective over a region of the moisture isotherm. When the exchange element is also to be effective over a larger climatic area, the gel must be given corresponding properties. This means that an effective gel is dependent on the availability of a controlled pore size distribution.

The pore distribution of a gel formed from a silicate solution or by converting more or less dry waterglass can be changed by particle growth. This mechanism, however, is not reversible, which means that the pore size will grow during the whole of the pore changing phase. In turn, this means that the mean pore size of the starting gel must be smaller than the desired mean pore size in order to obtain the desired pore structure in a controlled fashion.

It is known from the literature that it is possible to obtain initially a very small particle size with the aid of strong acids and therewith a small pore size. The resultant gelation takes place very quickly and the possibility of controlling the gelation process is very small.

SUMMARY OF THE INVENTION

The primary object of the present invention is to provide a method for treating a contact body of the aforedescribed kind, and particularly to a method for forming on the contact body a silica gel which will enable the number of pores and the pore size distribution in the gel structure produced to be controlled in a selective fashion.

This is achieved in accordance with the invention by impregnating the body with waterglass, treating the thus impregnated body with acid to produce a gel in a first method step, by causing the gel to mature in an environment of elevated pH to obtain a gel of desired pore structure in a second method step, and by stabilizing the gel with the addition of chemicals in a third method step.

Subsequent to gelation in acid, the gel can be influenced in a subsequent maturing process with a particle growth which proceeds at a controlled rate. Depending on the nature of the acid used, its concentration and temperature, there is typically obtained a gel whose mean pore size is in the region of 15–25 Å when applying the BET-measuring method. The mean pore size can then be increased to the desired range by a maturing process, this range being from 20–40 Å.

It is known that a desired mean pore size can be obtained in the absence of a maturing process, e.g. by the selection of an appropriate acid or acid salt solution. The basic reaction occurs very rapidly even in this case, and is therewith difficult to control. By applying the maturing principle in accordance with the present invention, it is possible to control both the mean pore size and the pore size distribution to a desired range in a controlled fashion.

DESCRIPTION OF THE PREFERRED EMBODIMENT

The invention will now be described in more detail with reference to exemplifying embodiments thereof.

Thus, when practicing the invention, the contact body is treated in three steps referred to as gelation, maturing and stabilization.

The first step, the gelation step, is effected by immersing the contact body, whose paper sheets have been impregnated with waterglass, into an acid bath, for instance a phosphoric or sulphuric acid bath, having a minimum concentration which corresponds to an equivalent conversion of the waterglass plus a convenient surplus such that the pH of the structure will always be less than 2.0. The treatment is effected preferably at a given elevated temperature, with weaker acids requiring a higher temperature than stronger acids. Other acids which can be used in the first method step are hydrochloric acid or nitric acid, although these acids give a poorer effect, however, than the acids first mentioned. Waterglass, or sodium silicate, is an alkaline substance having a pH≧11.5 and which can be gelled by adding the majority of organic or inorganic substances while lowering the pH. Thus, the pH is decisive in creating the desired pore structure, and in order to obtain a desired pore structure of very small pore size and small particle size, it is necessary to convert the waterglass rapidly at a pH of preferably less than 2.0.

In accordance with the invention, the silica gel is produced in the first method step with a small pore structure which in the continued treatment, in method step two, is caused to increase to a desired size, whereafter this desired pore structure is stabilized in the third method step, as described in more detail below. In the second method, step, the maturing step, chemicals are added which bring the pore structure to a desired value while controlling time and the temperature of the maturing bath at the same time. This chemical addition influences the pH-value, so that a delayed basic pH-value up to at most 10, preferably 7.5–9.5, is obtained which, together with the bath residence time and the bath temperature, is adjusted to give the pore structure the desired properties, i.e. the desired pore size and size distribution. The chemicals added to the maturing bath are preferably chemicals which will provide a sodium and potassium free, alkaline environment, for instance chemicals such as ammonium and ammonium compounds in an amount of about 1–25 g/liter or more, although higher values have no markedly improved effect. Prior to treating the body in method step two, the contact body can be rinsed with liquid to increase the pH-value and therewith reduce the chemical consumption in the maturing step.

Subsequent to having obtained the desired pore structure by treatment in the first two method steps, the pore structure is stabilized in the third method step. In this third method step, the contact body is immersed, rinsed and dried while adding Zn-compounds, phosphates or aluminium compounds to the bath. Rinsing of the contact body prior to the third method step can be omitted by adjustment of the chemicals used in step two to suitable quantities.

The inventive method will now be illustrated with reference to two Examples. Example 1

Subject: A rotor structure impregnated with hot air dried waterglass. Gelation in 3M phosphoric acid Time: 45 min.

Temperature: 60° C.

pH: 0.3 Rinsing in water for 15 minutes (elimination of reaction products and excessive acid). Maturing in 0.3% ammonium bicarbonate solution Time: 75 min.

Temperature: 80° C.

pH: 8 Stabilization with acid Al-ion solution

Time: 40 min.

Temperature: 60° C.

Concentration: 1M

Pore volume after gelation: 0.203 cc/g after maturing: 0.428 cc/g

Mean pore size after gelation: 23 Å after maturing: 33 Å

Specific surface area according to the BET-method after gelation: 595 $m^2$/g after maturing: 450 $m^2$/g The finished rotor material had a water adsorbency of: At 40% RF 37.0 g/l rotor material 62% RF 62.5 g/l rotor material 95% RF 93.5 g/l rotor material at a drive volume weight of 220 kg/$m^3$ and a corrugation height of 1.8 mm.

Example 2

The conditions in this Example are the same as the above conditions: Gelation in 6% sulphuric acid Time: 30 min.

Temperature: Room temperature pH: 0.6 Rinsing in water. Maturing in 2.5% ammonium solution Time: 60 min.

Temperature: Room temperature pH: 8 Rinsing in water. Stabilization with an aluminium ion solution Time: 30 min.

Temperature: 40° C.

Concentration: 0.1M

Pore volume after maturing: 0.400 cc/g

Mean pore size after maturing: 29 ÅSpecific surface area according to the BET-method after maturing: 649 $m^2$/g The water adsorbency of the rotor material at 65% RF was 82.8 g/l of rotor material.

I claim:

1. A method for treating a contact body for the exchange of heat or moisture, comprising the steps of:

a) impregnating the contact body with waterglass to obtain an impregnated body;

b) treating the impregnated body with acid to convert the waterglass to a silica gel;

c) exposing the treated impregnated body to a basic chemical solution to increase the pore size of the silica gel; and d) stabilizing the pore structure by exposing the silica gel to a stabilizing solution containing water soluble inorganic salts.

2. The method of claim 1 wherein the acid is selected from the group consisting of phosphoric acid, sulfuric acid, hydrochloric acid and nitric acid.

3. The method according to claim 1 or 2 wherein the step of exposing comprises exposing the silica gel to a sodium and potassium free alkaline environment.

4. The method of claim 3 wherein the step of stabilizing comprises placing the body into a chemical solution containing compounds selected from the group consisting of water soluble inorganic salts of zinc, aluminum and phosphate.

5. The method of claim 4 further comprising rinsing the impregnated body after placing in the stabilizing chemical solution and subsequently drying the rinsed impregnated body.

6. The method of claim 5 wherein the step of treating comprises placing the impregnated body in an acid bath to reduce the pH of the waterglass to below 2.0.

7. The method of claim 6 wherein the basic chemical solution has a pH of up to 10.

8. The method of claim 7 wherein the basic chemical solution has a pH between 7.5 and 9.5.

9. The method of claim 7 wherein the stabilizing chemical solution includes ammonium or ammonium compounds in an amount of between 1 to 25 g/liter.

10. The method of claim 1 wherein the step of treating comprises placing the impregnated body in an acid bath to reduce the pH of the waterglass to below 2.0.

11. The method of claim 10 wherein the basic chemical solution has a pH of up to 10.

12. The method of claim 11 wherein the basic chemical solution has a pH between 7.5 and 9.5.

13. The method of claim 3 wherein the stabilizing chemical solution includes ammonium or ammonium compounds in an amount of between 1 to 25 g/liter.

14. The method of claim 1 wherein the impregnated body is treated with the acid to produce a silica gel at a first temperature and the step of exposing is conducted at a second temperature greater than said first temperature.

15. The method of claim 1 wherein the pore structure of the stabilized silica gel is of a mean pore size of from 20–40 Å as determined utilizing the BET-measuring method.

16. A method of forming a contact body suitable for the exchange of heat or moisture, comprising the steps of:
   a) impregnating a contact body with waterglass to obtain an impregnated body;
   b) treating the impregnated body with acid to convert the waterglass to a silica gel having a pore structure, of a mean pore size of from 15–25 Å as determined utilizing the BET-measuring method;
   c) exposing the treated impregnated body to a basic chemical solution to increase the pore size of the silica gel, to a mean pore size of from 20–40 Å as determined utilizing the BET-measuring method; and
   d) stabilizing the pore structure by exposing the silica gel to a solution containing water soluble inorganic salts.

* * * * *